Dec. 20, 1960  L. L. WOLMAN  2,965,823
SERVO SYSTEM WITH NOISE SUPPRESSION FEEDBACK
Filed July 16, 1958  3 Sheets-Sheet 1

INVENTOR.
LANE L. WOLMAN
BY
ATTORNEY

Dec. 20, 1960 L. L. WOLMAN 2,965,823
SERVO SYSTEM WITH NOISE SUPPRESSION FEEDBACK
Filed July 16, 1958 3 Sheets-Sheet 2
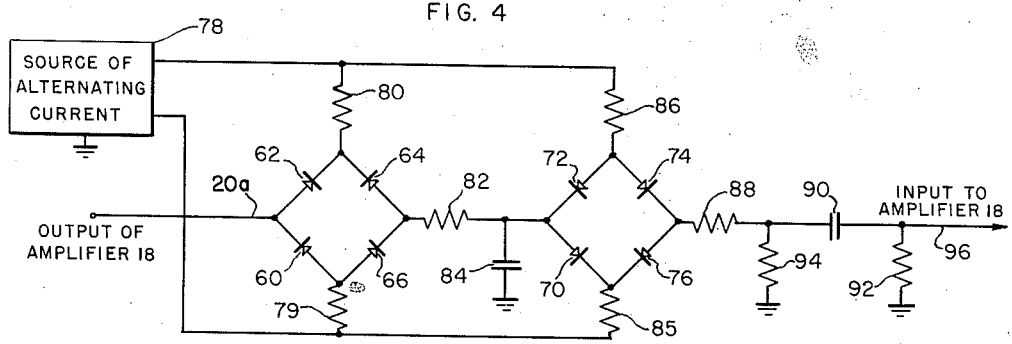
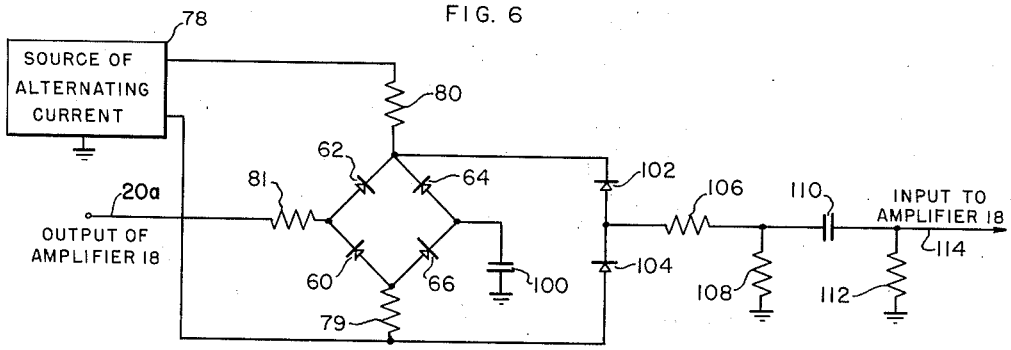
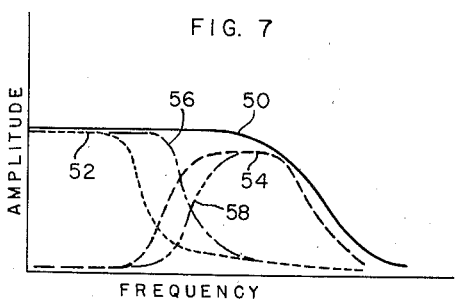
INVENTOR.
LANE L. WOLMAN
BY
ATTORNEY Dec. 20, 1960    L. L. WOLMAN    2,965,823
SERVO SYSTEM WITH NOISE SUPPRESSION FEEDBACK
Filed July 16, 1958    3 Sheets-Sheet 3
FIG. 8
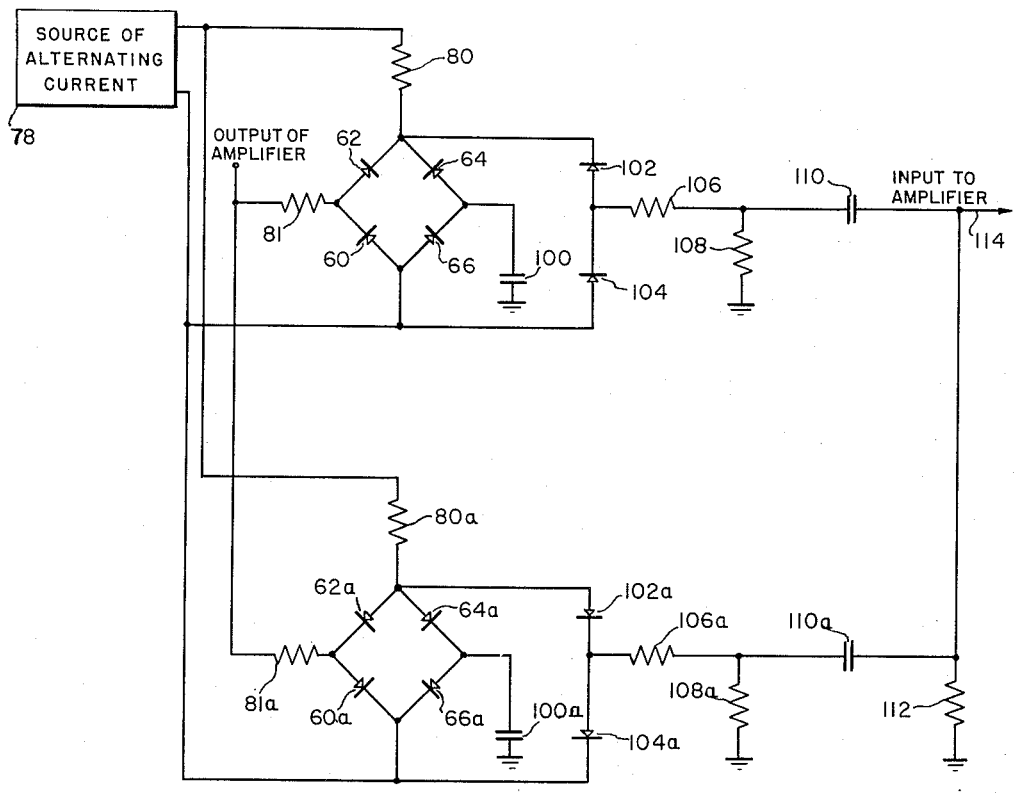
*INVENTOR.*
LANE L. WOLMAN
BY 
ATTORNEY

2,965,823

SERVO SYSTEM WITH NOISE SUPPRESSION FEEDBACK

Lane L. Wolman, North Hollywood, Calif., assignor to General Precision, Inc., a corporation of Delaware Filed July 16, 1958, Ser. No. 748,910

21 Claims. (Cl. 318—28)

This invention relates to servo systems, and more particularly to electrical systems which are adapted to be coupled to an output member so that the output member will accurately show the movements of an input member.

In many systems it is desired to have an output member at one position accurately follow the movements of an input member at another position. For example, it may be desired to have the cutter in a machine tool, such as a milling machine, accurately follow the movements provided by manual or automatic controls. As one illustration, these controls may be in the form of manually operated knobs, or they may be in the form of tapes having information punched into the tapes to indicate the desired movements of the cutter at successive intervals of time. As another example, it may be desired to have apparatus which controls the movements of an airplane in accordance with manually operated controls, or in accordance with signals provided by an automatic pilot.

In order to have the output member accurately follow the movements of the input member, various types of servo systems have been used. These servo systems measure the differences in the positioning of the output member relative to the input member and provide error signals which represent such differences in positioning, and which operate upon the output member to minimize such differences. For example, the error signal may be introduced to a servo motor which drives the output member toward a position which corresponds to that of the input member.

Because of the inertia of the output member, there is generally a tendency for the output member to overshoot the input member as the output member becomes adjusted in position to minimize any errors in positions between it and the input member. At such a time an error signal is produced to indicate the differences in positioning resulting from the overshooting of the output member relative to the input member. This error signal has an opposite polarity to the error signal initially produced and operates to drive the output member back toward the input member. Since an overshoot is now produced in the opposite direction, an oscillatory condition becomes established in which the output member hunts back and forth relative to the position of the input member in an attempt to reach the same position as the input member.

Various means have been used to prevent the hunting of the output member by providing a damping in the oscillatory movements of the output member about the desired position. For example, tachometers have been mechanically coupled to the servo motor to produce signals proportional too the velocity of the output member. These signals representing velocity are introduced to the servo motor in such a polarity as to damp the movements of the output member. However, tachometers have not been advantageous since they are relatively expensive, and since they require an additional movable member which occupies a considerable amount of space.

Another type of damping system differentiates the error signal at any instant to produce a signal representing the rate at which the error is changing at any instant. This error rate signal is then introduced to the servo motor in a proper polarity to produce a damping in the movement of the motor. The systems using error rate damping have been disadvantageous for certain important reasons.

One disadvantage in error rate systems results from the fact that the error signals are differentiated, and particularly results from the fact that any noise signals accompanying the error signals are also differentiated. Since the noise signals may tend to have a higher frequency than the error signals, the noise actually becomes accentuated in the error rate signals because of the operation of the differentiating circuits in accentuating signals at high frequencies relative to signals at low frequencies. Another disadvantage results from the fact that time lags are produced upon the conversion of error signals into error rate signals. Such time lags prevent the damping of the servo motor from occurring in synchronization with the production of the error signals. As a result, errors in the positioning of the servo motor are a natural consequence. Elimination of such time lags in the error rate signal is possible but is costly and elaborate.

This invention provides a system for damping the movements of an output member while overcoming all of the disadvantages set forth above. The system constituting this invention attenuates noise signals in comparison to the error signals produced at any instant such that the resultant signal produced by the system represents the true variation in error at any instant. The system constituting this invention is also advantageous in that it produces the error rate signal without any time lag between this signal and the error signal itself. The system obtains these advantages without any need for moving parts, such as are required in systems using tachometers.

The system constituting this invention achieves the advantages set forth in the previous paragraph by amplifying the signal representing the error at any instant and by integrating this amplified error signal. Integrating the amplified error signal tends to accentuate the low frequency signals representing the error in comparison to the high frequency signals representing noise. The integrated signals are then introduced to an input terminal of the amplifier to provide a control over the resultant signals introduced from the amplifier to the servo motor.

Integration of the error signal may be obtained by charging a capacitance to a value representing the amplitude of the error signal at any instant and by charging the capacitance in alternate half cycles of the error signals. In the other half cycles the capacitance becomes discharged through impedance members to produce an alternating signal having an amplitude representing the charge in the capacitance at any instant. In this way, the error signal becomes demodulated and subsequently remodulated to obtain the desired error integral signal. In certain embodiments of the invention the demodulation and remodulation of the error signal takes place in the same alternate half cycles.

In the drawings:

Figure 4 is a somewhat detailed circuit diagram of a servo system constituting a second embodiment of the invention;

Figure 6 is a somewhat detailed circuit diagram of a servo system constituting a third embodiment of the invention;

Figure 7 shows curves somewhat schematically illustrating the response characteristics of different stages in the embodiment shown in Figure 2 and in the modified embodiment shown in Figure 3; and Figure 8 shows a modification of the circuitry embodying this invention giving a full wave rectification.

Figure 1:
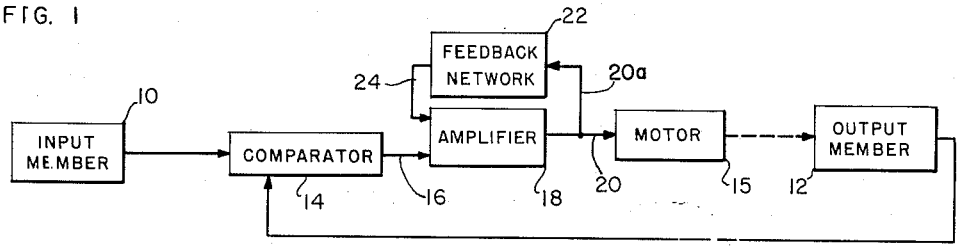
Figure 1 is a schematic view illustrating in block form the servo system constituting this invention.

In the block diagram shown in Figure 1, the positioning of an input member 10 and an output member 12 are compared by a comparator 14 to produce an error signal representing any differences in the positioning of the two members. The input member 10, the output member 12, and the comparator 14 are shown in block form in Figure 1 since such means are well known to persons skilled in the art. The output member may be driven by a motor 15 in accordance with signals introduced to the motor, as will be described in detail subsequently.

The input member 10 may have a wide variety of forms depending upon the particular system in which the member is included. For example, the input member may be a manually actuated control knob, or may be a control member which is positioned in accordance with the signals from a computer or from a measuring instrument. The output member may be a shaft for driving a load, or may be the rudder in an airplane, or may be any other member which has to be properly positioned. The comparator 14 may constitute a synchro which produces a signal having an amplitude proportional to the differences in the positioning of the input member 10 and the output member 12 at any instant. The comparator may have any other suitable type of construction.

The signals produced by the comparator 14 to represent the error are introduced through a line 16 to an amplifier 18 which may be constructed in any suitable manner. For example, the amplifier 18 may include a vacuum tube, or it may include a semi-conductor such as a transistor. The output signals from the amplifier 18 are introduced through a line 20 to the motor 15 to control the operation of the motor and the resultant positioning of the output member 12.

The output signals from the amplifier 18 are also introduced to a feedback network 22. This network operates to integrate the amplified error signal so as to accentuate the error signal relative to any noise signals which may have passed through the amplifier 18. The signals from the feedback network 22 are then introduced through a line 24 to the input terminal of the amplifier 18 so that the amplifier will produce an output signal dependent upon the signals introduced to it from the lines 16 and 24.

By integrating the output signals from the amplifier 18 and introducing the integrated signals to an input terminal of the amplifier 18, signals representing the variations in the error at any instant are produced on the line 24. This results from the fact that integration in a feedback loop is equivalent to differentiation in a forward direction. However, integration in a feedback loop is advantageous over differentiation in a forward direction in that it tends to accentuate the signals of low frequency relative to the signals of high frequency. This is advantageous since the signals of low frequency represent the error and the signals of high frequency represent noise.

Figure 2:
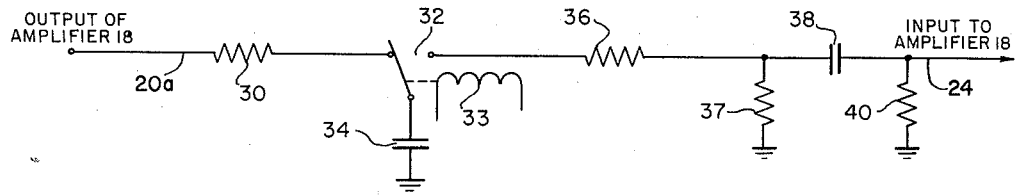
Figure 2 is a somewhat detailed electrical diagram of one embodiment of the servo system constituting this invention.

Figure 2 illustrates a circuit diagram consisting one embodiment of the feedback network 22 shown in Figure 1. In the embodiment of the invention shown in Figure 2, the signals introduced to the line 20a from the amplifier 18 pass through a resistance 30 to the left stationary contact of a high speed vibrating switch or chopper 32. The movable arm of the switch 32 may be spring-biased to normally engage the left stationary contact of the switch 32 in Figure 2, such spring-biasing not being shown in the drawings since it is well known to persons skilled in the art. The movable arm of the switch 32 may be magnetically coupled to a winding 33 so as to become actuated into engagement with the right stationary contact of the switch when the winding 33 becomes energized. The winding 33 may receive alternating signals having the same frequency as the error signals passing through the line 16 to the amplifier 18. The winding 33 may be constructed to actuate the movable arm of the switch 32 during particular half cycles, such as the negative half cycles of the error signals. As will be seen from the subsequent discussion, the switch 32 and the winding 33 may be considered as activating means, since they control the half cycles in which various operations occur.

The movable arm of the switch 32 is electrically connected to one terminal of an integrating member such as a capacitance 34, or any other suitable type of electrical member providing energy storage. The second terminal of the capacitance 34 is connected to a reference potential such as ground. The right stationary contact of the switch 32 in Figure 2 has a common connection with one terminal of a resistance 36, the second terminal of which is connected to first terminals of a resistance 37 and a capacitance 38. Connections are made from the second terminal of the resistance 37 to the reference potential, such as ground and from the second terminal of the capacitance 38 to a first terminal of a resistance 40 and to the line 24 leading to the input terminal of the amplifier 18. The second terminal of the resistance 40 is connected to the reference potential such as ground.

In alternate half cycles, the error signal on the line 20 causes current to flow through a circuit including the line 20, the resistance 30, the left stationary contact and the movable arm of the switch 32 and the capacitance 34. This current charges the capacitance 34 to a value dependent upon the amplitude of the error signal at any instant. In this way the alternating signal representing the error is demodulated by producing across the capacitance 34 a direct voltage proportional to the amplitude of the error signal at any instant.

The error signal is integrated at the same time that it is demodulated, since the synchronous operation of the switch 32 causes the error signal to be sampled by the capacitance 34 only in half cycles of a particular polarity, such as the positive polarity. Because of this the capacitance 34 effectively samples a direct signal and integrates this signal to produce a resultant charge in the capacitance. By integrating the error signal the capacitance 34 tends to accentuate the error signal in comparison to any noise signals. This results from the relatively low frequency of the error signal in comparison to the high frequency signals representing noise and also results from the characteristics of an integrator in accentuating signals of low frequency relative to signals of high frequency.

During the alternate half cycles in which the movable arm of the switch 32 is engaging the left stationary contact of the switch in Figure 2, any continuous circiut through the resistance 40 becomes interrupted. Since no current can flow through the resistance 40 in these alternate half cycles, zero potential is produced across the resistance 40. In the other alternate half cycles the movable arm of the switch 32 is actuated by the winding 33 into engagement with the right stationary contact of the switch in Figure 2. This causes the capacitance 34 to discharge through a circuit including the capacitance 34, the resistance 36, the capacitance 38, and the resistance 40. The flow of current in these half cycles is dependent upon the charge produced in the capacitance 34 in the previous half cycles. Because of this the potential produced on the output line 24 in these half cycles is dependent upon the charge produced in the capacitance 34 in the previous half cycles.

Since the potential across the resistance 40 varies between a zero value in alternate half cycles, and a value dependent upon the charge in the capacitance 34, an alternating signal is produced across the resistance. This alternating signal has an amplitude which is related at any instant to the charge in the capacitance 34. In this way the error signal introduced to the line 20a is demodulated by the capacitance 34 and is subsequently converted to a remodulated signal across the resistance 40. However, in the process of demodulating and subsequently remodulating signals, an accentuation is obtained in the error rate signal with respect to any noise signals.

The capacitance 38 provides a blocking action during the discharge of the capacitance 34 through the resistance 40 so that any D.C. components are removed in the signal produced across the resistance 40. The charge produced across the capacitance 38 during the discharge of the capacitance 34 through the resistance 40 in alternate half cycles leaks through the resistance 37 in the other half cycles. In this way, the capacitance 38 becomes prepared to block the passage of any D.C. components of signal through the resistance 40 in the next half cycles.

The response of the system shown in Figure 1 may be seen from certain curves shown in Figure 7. As will be seen, the error signal introduced to the line 20 may have a response curve indicated at 50 for a particular range of frequencies. Since the circuit shown in Figure 2 tends to accentuate signals at low frequencies relative to signals at high frequencies, the signal produced across the resistance 40 has a response curve indicated at 52 for the different frequencies. These signals are introduced to the amplifier 18 for combination with the signals having the response characteristics 50 such that the output from the amplifier has a response characteristic indicated at 54. As will be seen, the response curve 54 has a relatively low output for the low frequencies since the curves 50 and 52 tend to cancel each other for such frequencies.

Figure 3:
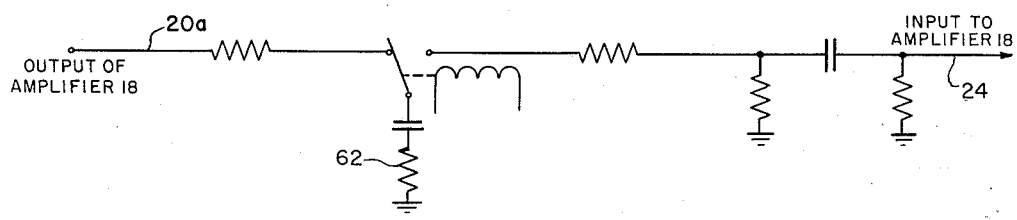
Figure 3 is a somewhat detailed electrical diagram of a servo system constituting a modification of the system shown in Figure 2.

The modification shown in Figure 3 is similar to the embodiment shown in Figure 2, except for the inclusion of a resistance 62 in series with the capacitance 34 between the movable arm of the switch 32 and the reference potential, such as ground. By including the resistance 62 the response curve of the system shown in Figure 3 for the different frequencies is flattened with respect to the response curve 50 for the system shown in Figure 2. In this way, a resultant curve 56 is obtained from the output line 24 for the modified embodiment shown in Figure 3. This results from the fact that a potential is produced across the capacitance 34 and the resistance 62, even after the capacitance 34 becomes saturated. This potential is produced because of the flow of current through the resistance 62 at such times. Since the flattened response curve 56 is obtained by including the resistance 62, this causes the amplifier 18 to produce a signal having response characteristics indicated at 58 in Figure 7.

In the embodiment shown in Figure 4 pluralities of unidirectional conducting members, such as diodes, replace the switch 32. In the embodiment shown in Figure 4 the diodes are arranged in bridge networks in which one bridge is formed by diodes 60, 62, 64 and 66, and in which a second bridge is formed by diodes 70, 72, 74 and 76. The output signals from the amplifier 18 in Figure 1 are introduced through the line 20a to the cathode of the diode 60 and to the plate of the diode 62. The potential on one terminal of a source of alternating voltage 78 is applied through a resistance 79 to the plates of the diodes 60 and 66. A second terminal of the voltage source 78 is connected to one terminal of a resistance 80 having the second terminal connected to the cathodes of the diodes 62 and 64. The voltage source 78 is adapted to provide signals at the same frequency as the frequency of the error signals introduced to the line 20a.

Connections are made from the plate of the diode 64 and the cathode of the diode 66 to one terminal of a resistance 82 having its other terminal connected to the plate of the diode 70 and the cathode of the diode 72. The second terminal of the resistance 82 is also connected to one terminal of a capacitance 84 having its second terminal connected to a reference potential, such as ground. The cathodes of the diodes 70 and 76 receive the potential on the first terminal of the voltage source 78 through a resistance 85, and the plates of the diodes 72 and 74 having alternating voltage applied to them through a resistance 86 from the second terminal of the voltage source.

A resistance 88, a capacitance 90 and a resistance 92 extend electrically in series to the reference potential, such as ground, from the cathode of the diode 74 and the plate of the diode 76. The resistance 88, the capacitance 90, and the resistance 92 correspond to the resistance 36, the capacitance 38 and the resistance 40 in Figure 2. A resistance 94 corresponding to the resistance 37 in Figure 2 is disposed electrically between the reference potential such as ground and the terminal common to the resistance 88 and the capacitance 90. The output signals produced on the terminal common to the capacitance 90 and the resistance 92 are applied through a line 96 to the input terminal of the amplifier 18 shown in Figure 1. It should be appreciated that the resistance in the various embodiments corresponding to the resistance 37 in Figure 2 and the resistance 94 in Figure 4 do not necessarily have to be included in the embodiments of the invention.

In first alternate half cycles, the potential introduced to the plates of the diodes 60 and 66 from the source 78 is more positive than the potential introduced to the cathodes of the diodes 62 and 64 from the source. This tends to produce a flow of current in one pair through the diodes 60 and 62 and in another pair through the diodes 64 and 66. Since the diodes 60, 62, 64 and 66 have low impedances in the forward direction, relatively small voltage drops are produced across the diodes 60 and 66. This causes the potential produced on the cathode of the diode 60 and the plate of the diode 62 to correspond in these half cycles to the potential produced on the plate of the diode 64 and the cathode of the diode 66.

Because of the equal potentials on the cathode of the diode 60 and the plate of the diode 62, and on the plate of the diode 64 and the cathode of the diode 66, a short circuit path is effectively produced from the line 20a to the resistance 82. This causes the bridge formed by the diodes 60, 62, 64 and 66 to effectively act as a closed switch in a manner similar to the switch 32, shown in Figure 2, so that the capacitance 84 becomes charged to a potential dependent upon the error signal on the line 20a.

In the other alternate half cycles the potential introduced to the cathodes of the diodes 62 and 64 is more positive than the potential introduced to the plate of the diodes 60 and 66. This causes the diodes 60, 62, 64 and 66 to provide a high impedance for preventing current from flowing through the diodes. Because of this high impedance an open circuit is effectively produced between the terminal common to the cathode of the diode 60 and the plate of the diode 62 and the terminal common to the plate of the diode 64 and the cathode of the diode 66. This open circuit prevents the capacitance 84 from becoming charged by the error signal on the line 20a in these alternate half cycles. This corresponds to the half cycles in the circuit shown in Figure 2 in which the movable arm of the switch 32 engages the right stationary contact of the switch.

As will be seen, the diodes 70, 72, 74 and 76 are connected in an opposite polarity in the second bridge relative to the connections of the diodes 60, 62, 64 and 66 in the first bridge. Because of this a short circuit is effectively produced across the second bridge from the capacitance 84 to the resistance 88 in the half cycles during which the first bridge receives an open circuit. This causes the capacitance 84 to discharge through a circuit including the resistance 88, the capacitance 90 and the resistance 92 in these half cycles, such that an alternating voltage is produced across the resistance. This alternating voltage is introduced to the amplifier 18 in a manner similar to that described previously to control the output signals produced by the amplifier.

As will be seen from the previous discussion, the bridge formed by the diodes 60, 62, 64 and 66 effectively performs a function equivalent to the left stationary contact and movable arm of the switch 32 in Figure 2. Similarly, the bridge formed by the diodes 70, 72, 74 and 76 effectively performs a function equivalent to that provided by the right stationary contact of the arm and the movable arm of the switch 32 in Figure 2. In this way the two bridges effectively operate as a single-pole, double-throw switch which is synchronized at the frequency of the signals provided by the voltage source 78. The two bridges are advantageous in that they operate on a static basis without requiring the movements of any elements such as the movable arm of the switch 32 in Figure 2.

Figure 5:
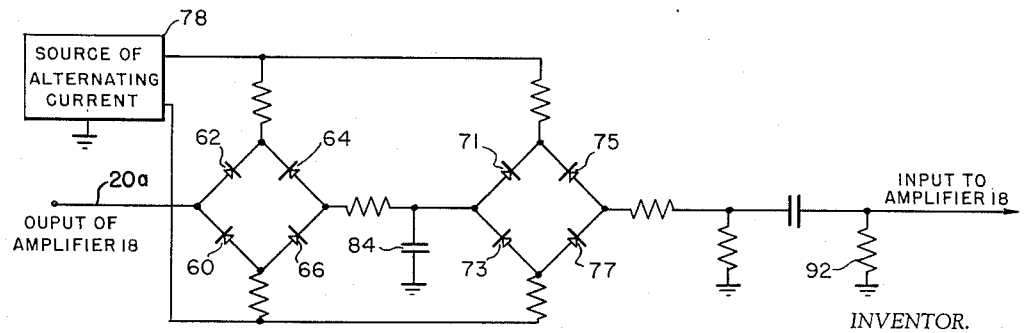
Figure 5 is a somewhat detailed circuit diagram of a system constituting a modification of the embodiment shown in Figure 4.

The system shown in Figure 5 is similar to the system shown in Figure 4 except that the polarities of the diodes 71, 73, 75 and 77 in the second bridge are reversed from that shown in Figure 4. Because of this the second bridge becomes short-circuited in the same half cycles as the first bridge. This causes the capacitance 84 to become charged in particular half cycles in accordance with the error signals on the line 20a, and to discharge through the resistance 92 in the same half cycles. By producing a simultaneous charging and discharging of the capacitance 84, the error signal becomes simultaneously demodulated and remodulated.

In the embodiment shown in Figure 5 the diodes may be types 1N458; the resistors may have values in the order of 10 kilo-ohms; and the capacitors may have values in the order of 1 microfarad. It will be appreciated that these are only representative values and that any other suitable values may also be used. It will also be appreciated that various components such as the resistance corresponding to the resistance 88 in Figure 4 do not necessarily have to be included in the embodiments shown in Figures 4 and 5.

The embodiment shown in Figure 6 includes the voltage source 78 and the diodes 60, 62, 64 and 66 arranged in a first bridge. In the embodiment shown in Figure 6, however, the plate of the diode 64 and the cathode of the diode 66 may be directly connected to one terminal of a capacitance 100, the second terminal of which is connected to a suitable reference potential such as ground. The cathodes of the diodes 62 and 64 have a common connection with the cathode of a diode 102, and the plates of the diodes 60 and 66 have a common connection with the plate of a diode 104. A resistor 81 corresponds to the resistor 82 of Figure 4.

A pair of resistances 106 and 108 extend electrically in series from the reference potential, such as ground, from the plate of the diode 102 and the cathode of the diode 104. It will be appreciated that the resistance 106 does not necessarily have to be included in the embodiment shown in Figure 6. The resistances 106 and 108 in Figure 6 correspond to the resistances 88 and 94 in Figure 4. Similarly, a capacitance 110 and a resistance 112 are in series between ground and a terminal common to the resistances 106 and 108. The capacitance 110 and the resistance 112 in Figure 6 correspond to the capacitance 90 and the resistance 92 in Figure 4. The signals produced across the resistance 112 are introduced through a line 114 to the input terminal of the amplifier 18 in Figure 1.

The bridge formed by the diodes 60, 62, 64 and 66 becomes energized in first alternate half cycles in a manner similar to that described above. This causes a short circuit to be effectively produced across the bridge so that the capacitance 100 can be charged in these alternating half cycles in accordance with the error signal produced on the line 20a. In these same alternate half cycles the diodes 104 and 102 become energized since they are connected in the same polarity as the diodes 60, 62, 64 and 66.

Since the diodes 104 and 102 have low impedances when energized, the impedance between the terminal common to the plate of the diode 64 and the cathode of the diode 66 and the terminal common to the plate of the diode 102 and the cathode of the diode 104 becomes relatively low. This effectively provides a short circuit between these terminals so that the capacitance 100 is able to discharge through a circuit including the resistance 106, the capacitance 110 and the resistance 112. In this way, the embodiment shown in Figure 6 corresponds to the embodiment shown in Figure 5 in that the capacitance 100 becomes charged and discharged in the same alternate half cycles.

In the modification shown in Figure 8 there is shown how the circuit of Figure 6 can be connected back to back to give a full wave rectification if desired. This same principle can if desired be applied to the other circuitry shown. The components shown in the upper half of the full wave circuit shown in Figure 8 are provided with numerical designations corresponding to those shown in Figure 6 and the components in the lower half of the full wave circuit are provided with the same numerical designations followed by the suffix "a."

What is claimed is:

1. In a servo system for controlling the operation of an output member in accordance with the operation of an input member, means for providing an error signal having an amplitude and phase representative of the error and recurring on a cyclic basis at a particular frequency, control means operative at the frequency of the error signals for providing a distinction between first alternate half cycles and the other alternate half cycles, means including a capacitance coupled to the error signal means and responsive to the control means for producing a charge in the capacitance in the first alternate half cycles in accordance with the characteristics of the error signal, means coupled to the capacitance and responsive to the control means in particular alternate half cycles for producing an alternating signal having a frequency corresponding to that of the error signal and having an amplitude related to the charge in the capacitance at any instant, and means for introducing the signal from the last mentioned means to the error signal means to obtain from the error signal means a resultant signal for controlling the operation of the output member.

2. In a servo system for controlling the operation of an output member in accordance with the operation of an input member, means for providing an error signal having an amplitude representing the error and recurring on a cyclic basis at a particular frequency, activating means operative on a cyclic basis corresponding to the cyclic production of the error signal, means activated by the activating means in particular half cycles and coupled to the error signal means during activation for amplifying signals of low frequency in the error signal relative to signals of high frequency to produce an attenuation of noise, means activated by the activating means in particular half cycles and coupled to the last mentioned means during activation for producing an alternating signal having a frequency corresponding to that of the error signal and having amplitude characteristics related to the characteristics of the error signal, and means for introducing the alternating signals from the last mentioned means to the error signal means to obtain a resultant signal from the error signal means for controlling the operation of the output member.

3. In a servo system for controlling the operation of an output member in accordance with the operation of an input member, means for providing a signal representing an error and having alternating characteristics and having an amplitude and a phase indicative of the error, intergrating means, activating means operative in particular half cycles to couple the integrating means to the alternating signal means for the production in the integrating means of a potential related to the integral of the error signal at any instant, remodulating means responsive to the activating means to become coupled to the integrating means in particular half cycles for the production in the remodulating means of an alternating singal having characteristics related to the integral of the error signal at any instant, the remodulating means being coupled to the error signal means for controlling the operation of the error signal means in accordance with the characteristics of the remodulated alternating signal to obtain from the error signal means a resultant signal for controlling the operation of the output member.

4. In a servo system for controlling the operation of an output member in accordance with the operation of an input member, means for providing a signal representing an error and having alternating characteristics and having an amplitude and a phase indicative of the error, demodulating means coupled to the error signal means in particular alternate half cycles of the alternating error signal to produce a signal representing an integral of the error, remodulating means coupled to the demodulating means in particular alternate half cycles of the alternating error signal to produce an alternating signal at the same frequency as the error signal and having amplitude characteristics dependent upon the integral of the error at any instant, and the remodulating means being coupled electrically to the error signal means to introduce the remodulated signal to the output member for obtaining a resultant signal from the error signal means to control the operation of the output member.

5. In a servo system for controlling the operation of an output member in accordance with the operation of an input member, means for providing an error signal, means coupled to the error signal means for converting the error signal into a proportionate direct voltage and for integrating the direct voltage, means coupled to the integrating means for converting the integrated direct voltage into a proportionate alternating signal, and means for introducing the proportionate alternating signal to the error signal means to obtain from the error signal means a resultant signal for controlling the operation of the servo system.

6. In a servo system for controlling the operation of an output member in accordance with the operation of an input member, means for providing signals representing an error and recurring at a particular frequency and having an amplitude and phase representative of the error, switching means operative at the frequency of the error signals to provide first and second states of operation, means including a capacitance coupled to the switching means for producing a charging of the capacitance in a particular state of operation of the switching means and in accordance with the characteristics of the error signal, and means including an impedance member coupled to the capacitance in a particular state of operation of the switching means for obtaining a discharge of the capacitance through the impedance member for the production across the impedance member of an alternating signal having an amplitude proportional to the charge across the capacitance at any instant, the error signal means being responsive to the alternating signal across the impedance member for producing a resultant signal for introduction to the output member to control the operation of the member.

7. In a servo system for controlling the operation of an output member in accordance with the operation of an input member, means for providing an error signal having alternating characteristics representing the extent of the error, a chopper having first and second stationary contacts and having an arm movable between the first and second stationary contacts, means including the chopper for producing an engagement between the movable arm and the first and second stationary contacts at a frequency corresponding to the frequency of the error signal, a first capacitance and the movable arm and the first stationary contact of the switch being connected in first electrical circuitry with the error signal means to produce a charge across the capacitance in accordance with the characteristics of the error signal at any instant, and a second capacitance and a first resistance and the movable arm and the second stationary contact of the switch being connected in electrical circuitry with the first capacitance to produce across the capacitance an alternating signal having an amplitude related to the charge in the capacitance at any instant, the error signal means being responsive to the signal across the first resistance for producing a resultant signal for introduction to the output member to control the operation of the member.

8. The servo system as set forth in claim 7 in which a second resistance is included in the first electrical circuitry and in which the voltage developed across the first capacitance and the second resistance is introduced to the second electrical circuitry to control the production of the alternating signal across the first resistance.

9. In a servo system for controlling the operation of an output member in accordance with the operation of an input member, means for providing an error signal having characteristics representative of the error and recurring on a cyclic basis at a particular frequency, means including a first plurality of unidirectional conducting members operative at the frequency of the error signal to become activated in particular alternate half cycles, means including a second plurality of unidirectional conducting members operative at the frequency of the error signal to become activated in particular alternate half cycles, means including integrating means coupled electrically to the first plurality of unidirectional conducting members and to the error signal means to introduce energy into the integrator during the activation of the members for storing in the integrator an amount of energy representing the integral of the error signal at any instant, and means including an impedance member coupled electrically to the integrator and to the second plurality of unidirectional conducting members to produce across the impedance member an alternating signal in accordance with activation of the unidirectional conducting members in the second plurality, the error signal means being responsive to the alternating signal across the impedance member to produce a resultant signal for controlling the operation of the output member.

10. The servo system set forth in claim 9 in which the undirectional conducting members in the second plurality are connected to become activated in the same alternate half cycles as the first plurality of undirectional members.

11. The servo system set forth in claim 9 in which the undirectional conducting members in the second plurality are connected to become activated in second alternate half cycles different from the alternate half cycles in which the first unidirectional conducting members become activated.

12. In a servo system for controlling the operation of an output member in accordance with the operation of an input member, means for providing an alternating error signal having an amplitude and phase representative of the error and having a particular frequency, means including a first plurality of unidirectional conducting means connected in a particular relationship to become activated in particular alternate half cycles of the particular frequency, means including a second plurality of unidirectional conducting means connected in a particular relationship to become activated in particular alternate half cycles of the particular frequency, means including a first capacitance connected in a first electrical circuit with the error signal means and the first plurality of unidirectional conducting means to produce across the capacitance a direct voltage proportional to the integral of the error signal at any instant and in accordance with the activation of the first plurality of unidirectional conducting means, and means including a second capacitance and a first resistance connected in a second electrical circuit with the first capacitance and the second plurality of unidirectional conducting means for producing an alternating voltage having an amplitude proportional to the charge across the first capacitance at any instant and in accordance with the activation of the unidirectional conducting means in the second plurality, the error signal means being coupled electrically to the first resistance to produce an output signal in accordance with the characteristics of the alternating signal produced across the first resistance to provide a control over the operation of the output member.

13. In the servo system set forth in claim 12, a second resistance connected with the first capacitance in the first and second electrical circuit to obtain the production of an alternating voltage across the first resistance in accordance with the voltage produced across the first capacitance and the second resistance at any instant.

14. The servo system as set forth in claim 12, in which the unidirectional conducting members in the first plurality are connected in a bridge relationship, and in which opposite terminals in the bridge are coupled electrically to the error signal means and to the first capacitance, and in which the unidirectional members in the second plurality are connected to become activated in the same alternate half cycles as the unidirectional conducting members in the first plurality.

15. The servo system as set forth in claim 12 in which the unidirectional conducting members in the first plurality are connected in a bridge relationship, and in which opposite terminals in the bridge are coupled electrically to the error signal means, and to the first capacitance and in which the unidirectional members in the second plurality are connected to become activated in the alternate half cycles other than those in which the unidirectional conducting members in the first plurality become activated.

16. In a servo system for controlling the operation of an output member in accordance with the operation of an input member, means responsive to the input and output members for producing error signals representing any difference in the positioning of the input and output members, means including electrical circuitry responsive to the error signals for producing error rate signals and for increasing the effect of the error rate signals relative to any noise signals and for introducing the error rate signals to the error signal means to produce control signals representing a composite of the error signals and the error rate signals, and means including a motor responsive to the control signals for changing the position of the output member in accordance with the control signals to obtain conformations in the positioning of the output member relative to the input member.

17. A servo system for controlling the operation of an output member in accordance with the operation of an input member, means responsive to the input and output members for producing error signals representing any difference in the positioning of the input and output members, switching means movable at a particular frequency between first and second positions, electrical circuitry including a first resistance and a first capacitance connected in a series circuit with the error signal means in the first position of the switching means, electrical circuitry including a second capacitance and a second resistance connected in a series circuit with the first capacitance in the second position of the switching means, and means including a driving member responsive to the error signals and to the signals produced across the second resistance for changing the position of the output member in accordance with these signals.

18. The system set forth in claim 17 in which a third resistance is connected to the first capacitance for a series relationship with the first capacitance and the first resistance in the first position of the switching means and for a series relationship with the first capacitance, the second capacitance and the second resistance in the second position of the switching means.

19. In a servo system for controlling the operation of an output member in accordance with the operation of an input member, means for providing an alternating error signal having an amplitude and phase representative of the error and having a particular frequency, means including a first plurality of unidirectional conducting means connected in a first bridge relationship to become activated in particular alternate half cycles of the particular frequency, the first bridge being constructed to provide first and second pairs of terminals, means including a second plurality of unidirectional conducting means connected in a second bridge relationship to become activated in particular alternate half cycles of the particular frequency, the second bridge being constructed to provide first and second pairs of terminals, means including a source of alternating current connected to the first pair of terminals in the first bridge and to the first pair of terminals in the second bridge to introduce signals at the particular frequency to the first and second bridges for energizing the bridges in alternate half cycles, means including a first capacitance and a first resistance connected in a first series circuit with the error signal means and with the second pair of terminals in the first bridge to produce across the capacitance a direct voltage proportional to the integral of the error signal at any instant and in accordance with the energizing of the first bridge by the source of alternating current, and means including a second capacitance and a second resistance connected in a series circuit with the first capacitance and with the second pair of terminals in the second bridge for producing across the second resistance an alternating voltage having an amplitude proportional to the charge across the first capacitance at any instant and having the particular frequency and in accordance with the energizing of the second bridge by the source of alternating current, and means including motive means responsive to the error signal and to the signal produced across the second resistance and coupled to the output member to drive the output member in accordance with the characteristics of the error signal and the signal across the second resistance.

20. The system set forth in claim 19 in which the unidirectional means in each of first and second bridges are connected in opposite polarities relative to the connections of the unidirectional means in the other bridge to provide for a charge of the first capacitance in first alternate half cycles and to provide for a discharge of the first capacitance through the second resistance in the other alternate half cycles.

21. The combination set forth in claim 20 in which the unidirectional means in each of the first and second bridges are connected in the same polarity relative to the connections of the unidirectional means in the other bridge to provide for a charge of the capacitance in particular alternate half cycles and to provide for a discharge of the first capacitance through the second resistance in the particular alternate half cycles.

References Cited in the file of this patent

UNITED STATES PATENTS

| | | |
|---|---|---|
| 2,446,567 | White et al. | Aug. 10, 1948 |
| 2,529,459 | Pourciau et al. | Nov. 7, 1950 |
| 2,632,872 | Warsher | Mar. 24, 1953 |
| 2,832,020 | Towner | Apr. 22, 1958 |

OTHER REFERENCES

Ahrendt, William R.: Servomechanism Practice, McGraw-Hill, New York, 1954 p. 220, lines 15–19.